L. C. WOOD.
CLUTCH MECHANISM.
APPLICATION FILED MAR. 11, 1915.
1,248,773.
Patented Dec. 4, 1917.
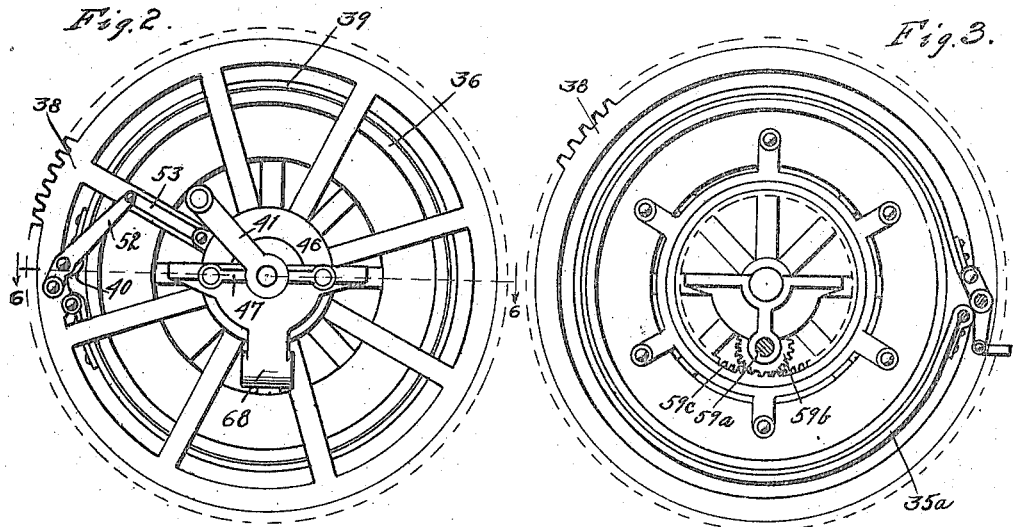
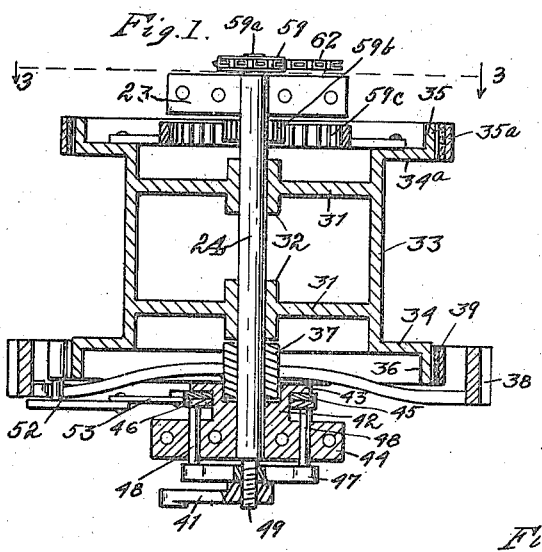
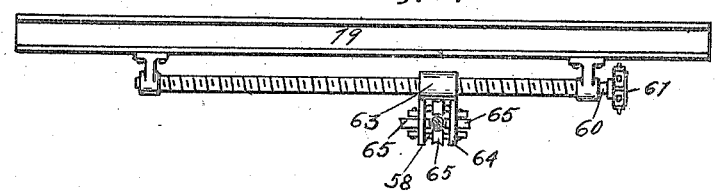
Witnesses.
Inventor
Leonard C. Wood.
By Orwig & Bair
Att'ys

UNITED STATES PATENT OFFICE.

LEONARD C. WOOD, OF ALDEN, IOWA.

CLUTCH MECHANISM.

1,248,773. Specification of Letters Patent. Patented Dec. 4, 1917.

Application filed March 11, 1915. Serial No. 13,743.

*To all whom it may concern:*

Be it known that I, LEONARD C. WOOD, a citizen of the United States, and resident of Alden, in the county of Hardin, and State of Iowa, have invented a certain new and useful Clutch Mechanism, of which the following is a specification.

The object of my invention is to provide clutch mechanism of simple and durable construction.

A further object is to provide an efficient clutch of the type having a main power clutch which is in turn controlled by a second manually operated clutch, such as is common in heavy hoisting machinery or the like.

A further object is to provide such a clutch having means for accurately regulating the slippage necessary due to overloads, inertia, and the like.

A further object is to provide such a clutch also capable of manual control of the second clutch whereby either an instantaneous or a gradual gripping of the first clutch is accomplished.

My invention consists in the arrangement, construction and combination of the various parts of the device whereby the objects contemplated are attained, as hereinafter more fully set forth pointed out in my claims, and illustrated in the accompanying drawings, in which:

Figure 1 is a horizontal central sectional view of a clutch mechanism embodying my invention.

Fig. 2 is an end elevation thereof.

Fig. 3 is an end elevation of the opposite end of my device taken on the line 3—3 of Fig. 1.

Fig. 4 shows a detailed view of a suitable means for insuring the proper winding of a cable upon the drum shown in connection with my device.

Referring to the accompanying drawings, I have shown my clutch mechanism in connection with a hoisting or winding drum, and suitable means for insuring regular winding of the cable upon the drum. A drum shaft 24 is suitably fixed between two supports 23 and 44 adjacent to any source of power. Mounted on the drum shaft 24 is a drum of somewhat peculiar construction, comprising two spaced hubs 32 having the radially extending spokes 31. Formed on the ends of the spokes 31 is a cylindrical drum member 33 which extends beyond the hubs, as clearly shown in Fig. 1. At its ends the cylinder 33 is provided with annular flanges 34 and 34$^a$, at the peripheries of which are annular outwardly extending flanges 35 and 36, flanges 35 and 36 forming friction drums for a purpose herewith stated.

Mounted on the shaft 24, adjacent to one of the hubs 32 is a hub 37 of a gear wheel 38, which is adapted to be driven by said source of power. Pivoted to the gear wheel 38 is one end of a friction strap 39 (shown in Fig. 2), which encircles the flange 36. The other end of the friction strap 39 is pivoted to the lever 40, which lever is pivoted to the gear 38.

One end of the shaft 24 is screw threaded and thereon adjacent to the gear 38 is a screwed crank 41.

Formed integral with the support 44 and surrounding the shaft 24 is a hub 42 having at its inner end a socket to receive one end of the hub 37 and an annular flange 43. The support 44 extends some distance above the shaft 24 whereby an annular groove is formed between such upstanding portion and the flange 43.

Loosely mounted on the hub 42 adjacent to the flange 43 is a ring or washer 45. Loosely mounted on the hub 42 adjacent to the ring or washer is a ring or washer 46. Loosely mounted on the outer end of the shaft 24, adjacent to the support 44 is a plate 47, secured to which are pins 48. The pins 48 extend through the support 44 and are secured to the ring or washer 46.

Suitable means are provided for manually controlling the crank 41 whereby it may be screwed far enough on the shaft to slide plate 47, pins 48, and ring 46 longitudinally of the shaft, thereby bringing ring 45 into frictional engagement with ring 46 and flange 43 and tending to prevent or retard rotation of ring 45.

A link 52 is pivoted to a bracket 40, which is secured to friction strap 39 intermediate of its ends and has its outer end pivoted to the gear 38. Pivoted to the other end of link 52 is a link 53, which is in turn pivoted to the ring or washer 45, on the flange 35 is a band brake 35$^a$ operatively connected with suitable operating means. This brake mechanism makes it possible to hold the cable taut at all times and enables the operator to prevent spinning of the drum.

The shaft 24 and the member 42 are stationary, so that the rotation of the gear 38 will cause the links 52 and 40 to be drawn inwardly, thereby tightening the band brake 39 on the flange 36, and causing the drum 33 to rotate with the gear 38, thereby winding the cable on the drum.

The mechanism for guiding the cable for properly winding it on the drum will be hereinafter described. It will be noted in this connection that when the power is first applied some slippage may occur between the parts 45 and 46, and possibly between the band brake and the flange 36 thereby preventing too great a strain on the parts. On the other hand, the construction hereinbefore shown, furnishes proper clutch connections between the source of power and the drum for operating the drum as may be desired. The speed of the drum may be regulated by the controlling part of the source of power, and may also be regulated to some extent by varying the position of the lever 41.

The cable guiding means, hereinbefore referred to, comprises a gear 59 on a short shaft 59ᵃ. A shaft 60 is rotatably mounted on a suitable support 19, and operated by a gear 61 on the shaft 60 in line with the gear 59 and a sprocket-chain 62 on the gears 59 and 61. On the short shaft 59ᵃ is another gear 59ᵇ in mesh with an internal gear 59ᶜ on the drum.

My drum cable controlling devices, as shown, are adapted to wind only one coil rope of cable on the drum, but it will readily be seen that by providing the proper clutch mechanism on the machine, the cable controlling device could be made to operate in both directions on the shaft 60. The shaft 60 is screw threaded, and carries a collar 63, on which is mounted or formed a frame 64 carrying guide pulleys or wheels 65 between which the cable 58 is threaded. It will be understood that the collar is internally screw threaded, and that the rotation of the shaft 60 moves the collar 63 from one end to the other of said shaft. The direction of said movement may be reversed by reversing the source of power.

It will be understood that this clutch mechanism is primarily intended to be used in situations where the loads on the cable of a drum mechanism are irregular and oftentimes too great to be pulled. By the construction shown the grip of the friction strap may be positively controlled by the crank 41 to impart rotation from gear 38 to friction drum 36 gradually or positively.

I claim as my invention.

1. A pair of spaced supports, a shaft fixed thereto having one end screw threaded, a hub fixed to the support adjacent to the last described end of the shaft and encircling said shaft, said hub having an annular outwardly extending flange at its inner end, a ring rotatably mounted on said hub adjacent to said flange, a second ring slidably but nonrotatably mounted on the hub adjacent thereto, a crank having an internally screw threaded opening in one end adapted to receive the threaded end of the shaft, means for imparting longitudinal movement relative to the shaft from the crank to the second described ring, a gear journaled adjacent thereto, a friction drum journaled adjacent to the gear, a friction strap secured to the gear and adapted when tightened to coact with the friction drum, and means for operatively connecting the friction strap with the first described ring.

2. A pair of spaced supports, a shaft fixed therebetween, a gear rotatably mounted thereon, a friction drum similarly mounted adjacent thereto, a friction strap secured to the gear and adapted when tightened to coact with the friction drum, a ring rotatably mounted adjacent to the gear, a nonrotatable annular flange disposed at one side of the ring, a nonrotatable ring disposed at the other side of said ring, means adapted to cause the second described ring and the flange to frictionally engage the rotatable ring, and means for operatively connecting the rotatable ring with the friction strap.

Des Moines, Iowa, January 30, 1915.

LEONARD C. WOOD.

Witnesses:
J. N. BIRDSALL,
G. F. BIGELOW.

Copies of this patent may be obtained for five cents each, by addressing the "Commissioner of Patents, Washington, D. C."